United States Patent
Davison et al.

(10) Patent No.: US 7,859,802 B2
(45) Date of Patent: Dec. 28, 2010

(54) BURDEN RESISTOR TEMPERATURE COMPENSATION ALGORITHM

(76) Inventors: William Davison, 2451 5th Ave. SE., Cedar Rapids, IA (US) 52403; Kevin John Malo, 835 Oakcrest, Iowa City, IA (US) 52246; Steve M. Meehleder, 505 Huntington Ridge Rd., Cedar Rapids, IA (US) 52402; Ryan James Moffitt, 2257 10th St., Coralville, IA (US) 52241; Paul Andrew Reid, 430 Dunreath Dr. NE., Cedar Rapids, IA (US) 42402

( * ) Notice: Subject to any disclaimer, the term of this patent is extended or adjusted under 35 U.S.C. 154(b) by 728 days.

(21) Appl. No.: 11/824,680

(22) Filed: Jul. 2, 2007

(65) Prior Publication Data
US 2008/0012669 A1 Jan. 17, 2008

Related U.S. Application Data
(60) Provisional application No. 60/831,006, filed on Jul. 14, 2006.

(51) Int. Cl.
*H01H 77/04* (2006.01)
*H01H 81/02* (2006.01)
(52) U.S. Cl. .......................................... 361/42; 355/44
(58) Field of Classification Search .................. 361/42, 361/93.8, 103; 200/400; 337/3, 13
See application file for complete search history.

(56) References Cited

U.S. PATENT DOCUMENTS

| | | | |
|---|---|---|---|
| 4,301,435 A | 11/1981 | Castonguay et al. | 335/26 |
| 4,679,019 A | 7/1987 | Todaro et al. | 335/172 |
| 4,951,052 A | 8/1990 | Jacob et al. | 341/122 |
| 4,992,723 A | 2/1991 | Zylstra et al. | 323/284 |
| 5,014,025 A | 5/1991 | Papallo, Jr. et al. | 335/167 |
| 5,124,875 A | 6/1992 | Ishii et al. | 361/93 |

(Continued)

FOREIGN PATENT DOCUMENTS

EP 0 303 994 A 2/1989

(Continued)

OTHER PUBLICATIONS

Written Opinion corresponding to co-pending International Patent Application Serial No. PCT/US2007/015914, European Patent Office, dated Mar. 14, 2008, 8 pages.

(Continued)

*Primary Examiner*—Jared J Fureman
*Assistant Examiner*—Angela Brooks

(57) ABSTRACT

An automatic temperature compensation method that automatically adjusts trip point thresholds of a motor circuit protector in response to changes in temperature. The relationship between two curves is exploited to match temperature sensor readings from a temperature sensor circuit with burden resistor percentage values derived from a burden resistor circuit. A temperature inflection point is determined from the intersection of (1) the temperature sensor curve plotting the voltage output of the temperature sensor versus temperature and (2) the burden resistance curve plotting burden resistance versus temperature. A temperature value along the temperature sensor curve is transformed into the corresponding burden resistance on the burden resistance curve. The burden resistance is expressed as a percentage variance from a burden resistance at an ambient temperature. An adjusted trip point threshold is calculated from the computed burden resistor percentage, and the adjusted trip point threshold is stored in a memory.

19 Claims, 10 Drawing Sheets

U.S. PATENT DOCUMENTS

| | | | | |
|---|---|---|---|---|
| 5,276,416 | A | | 1/1994 | Ozaki .................... 335/18 |
| 5,331,501 | A | * | 7/1994 | Shimp .................... 361/94 |
| 5,343,179 | A | | 8/1994 | Pipich et al. ............ 335/167 |
| 5,510,773 | A | | 4/1996 | Rodgers ................. 340/638 |
| 5,646,586 | A | | 7/1997 | Castonguay et al. ..... 335/132 |
| 5,666,256 | A | | 9/1997 | Zavis et al. ............. 361/115 |
| 5,670,923 | A | | 9/1997 | Gonzalez et al. ........ 335/177 |
| 5,701,111 | A | | 12/1997 | Castonguay et al. ..... 335/177 |
| 5,710,399 | A | | 1/1998 | Castonguay et al. ..... 200/17 R |
| 5,818,301 | A | * | 10/1998 | Higashiyama et al. ..... 330/266 |
| 6,009,615 | A | | 1/2000 | McKean et al. .......... 29/602.1 |
| 6,031,195 | A | | 2/2000 | Meili et al. ............. 200/318 |
| 6,061,217 | A | | 5/2000 | Grunert et al. ........... 361/42 |
| 6,067,797 | A | * | 5/2000 | Silverbrook ............. 60/528 |
| 6,084,756 | A | | 7/2000 | Doring et al. ............ 361/45 |
| 6,154,115 | A | | 11/2000 | Flohr .................... 337/13 |
| 6,167,329 | A | * | 12/2000 | Engel et al. ............. 361/93.2 |
| 6,351,232 | B1 | | 2/2002 | Marie .................... 341/155 |
| 6,466,424 | B1 | * | 10/2002 | Larranaga et al. ........ 361/103 |
| 7,307,504 | B1 | | 12/2007 | Carlino et al. ........... 336/213 |
| 2002/0145416 | A1 | | 10/2002 | Attarian et al. ........... 324/127 |
| 2005/0103613 | A1 | * | 5/2005 | Miller .................... 200/400 |
| 2005/0219032 | A1 | * | 10/2005 | Williams et al. ......... 337/3 |

FOREIGN PATENT DOCUMENTS

| | | |
|---|---|---|
| EP | 0 477 936 A | 4/1992 |
| EP | 0 580 473 A | 1/1994 |
| GB | 397 635 A | 8/1933 |
| GB | 1 293 134 A | 10/1972 |
| GB | 2 360 135 A | 9/2001 |
| WO | WO 2006/087342 A1 | 8/2006 |

OTHER PUBLICATIONS

International Search Report corresponding to co-pending International Patent Application Serial No. PCT/US2007/015914, European Patent Office, dated Mar. 14, 2008, 8 pages.

* cited by examiner

BURDEN RESISTOR TEMPERATURE COMPENSATION ALGORITHM

RELATED APPLICATION

The present application claims the benefit of U.S. Provisional Application No. 60/831,006, filed Jul. 14, 2006, titled "Motor Circuit Protector," and hereby incorporates that application by reference in its entirety.

FIELD OF THE INVENTION

This invention is directed generally to a temperature compensation algorithm, and, more particularly, to a burden resistor temperature compensation algorithm in a circuit breaker.

BACKGROUND OF THE INVENTION

As is well known, a circuit breaker is an automatically operated electro-mechanical device designed to protect a conductor from damage caused by a power overload or a short circuit. Circuit breakers may also be utilized to protect loads. A circuit breaker may be tripped by an overload or short circuit causing an interruption of power to the load. A circuit breaker can be reset (either manually or automatically) to resume power flow to the loads. One type of circuit breaker that provides instantaneous short circuit protection to motors and/or motor control centers ("MCC") is called a motor circuit protector (MCP). A typical MCP includes a temperature-triggered overload relay, a circuit breaker, and a contactor. An MCP circuit breaker must meet National Electric Code ("NEC") requirements when installed as part of a UL-listed MCC to provide instantaneous overload protection.

Mechanical circuit breakers energize an electromagnetic device such as a solenoid to trip a breaker instantaneously due to large surges in current such as by a short circuit. The solenoid is tripped when current exceeds a certain threshold. MCPs must protect against fault currents while avoiding tripping on in-rush motor currents or locked-rotor currents, but these current levels vary by motor. Existing MCPs have a relatively limited operating range, so they are suitable for protecting motor circuits within the MCP's operating range. For motor circuits outside of a particular MCP's operating range, a different MCP must be designed for the operating parameters of those motor circuits.

Fault currents are sensed by one or more current transformers that inductively couple a primary current into a secondary current according to a transfer function that defines a linear and saturation operating region of the current transformer. The transfer function of a current transformer shifts with temperature such that a higher secondary current output is produced for the same primary current input as temperature increases. The higher secondary current output has the effect of causing the MCP to trip sooner. To compensate for variances in environmental temperature, trip curves should be adjusted upwards or downwards. What is needed is a temperature compensation algorithm that automatically adjusts trip curve settings to compensate for changes in temperature.

Aspects of the various embodiments disclosed herein are directed to fulfilling these and other needs.

SUMMARY OF THE INVENTION

Aspects of the various embodiments disclosed herein relate to a temperature compensation algorithm that uses low-cost sensor technology and a low-cost microcontroller to achieve real-time temperature compensation. A sensor equation transformation relationship is disclosed to efficiently convert temperature sensor readings directly to burden resistance percentage values. The burden resistance percentage values are used to efficiently adjust trip point thresholds. The temperature compensation techniques disclosed herein can be applied to a wide variety of industrial sensor detection applications that incorporate copper sensing resistors. In general, aspects disclosed herein can be extended to other sensor technologies where temperature sensor equations are deliberately matched with compensated sensors.

According to various embodiments, the temperature compensation algorithm takes advantage of the following two sensor relationships: first, the base-emitter voltage equation of a PNP transistor as a function of temperature; second, the temperature versus resistance relationship of a copper burden resistor. These sensor relationships are deliberately matched to enable a simple transformation from sensor temperature to burden resistor percentage values. Data values from the negative-sloping temperature sensor are transformed to the positive sloping copper relationship of the burden resistor. The transformation is designed about the raw sensor data intercepts with adjusted offset compensation.

The data output of the temperature compensation algorithm is the percentage operation point of the burden resistor relative to 100% at 25 degrees C. (ambient temperature). Operation range is designed for the intended temperature operating range of the compensated burden resistor sensor.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings, in which.

Figure 9A:
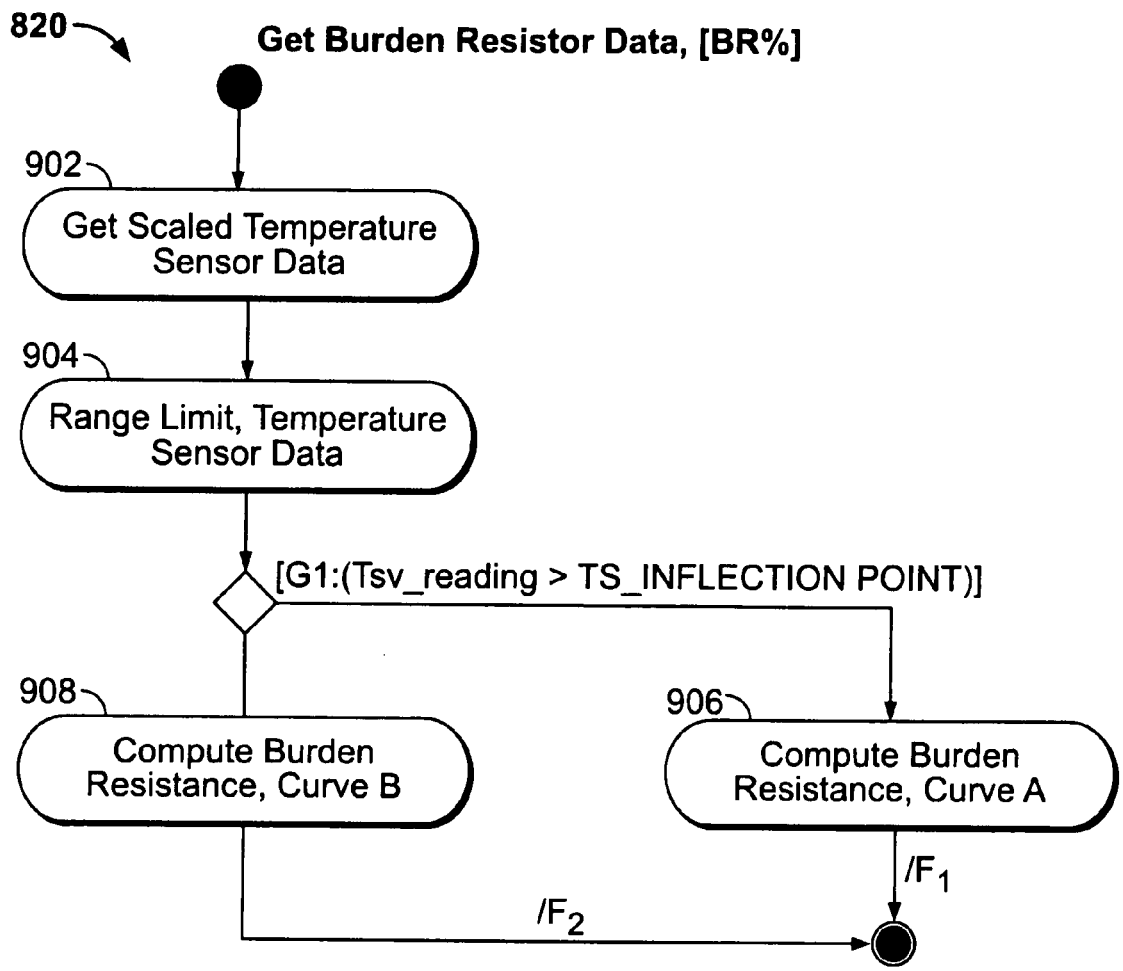
FIG. 9A is a UML diagram of a get burden resistor data sequence shown in FIG. 8B.
Figure 9B:
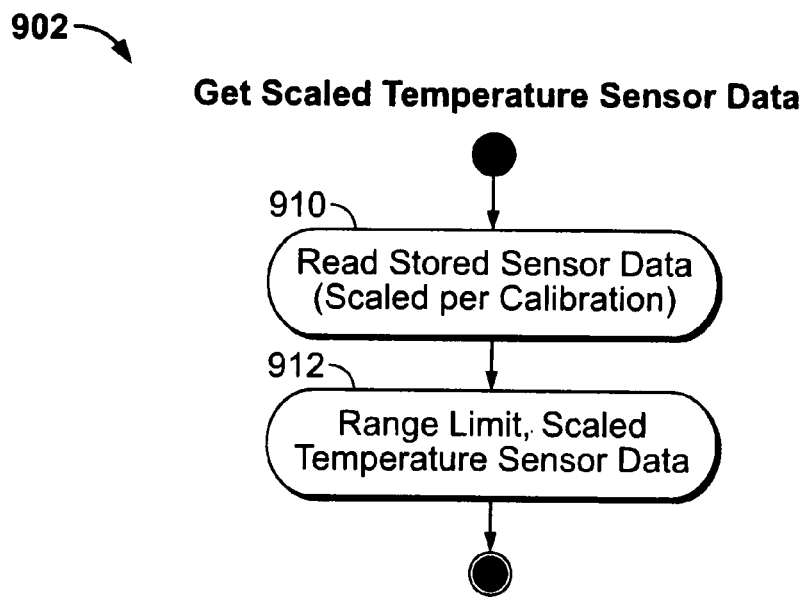
Figure 9C:
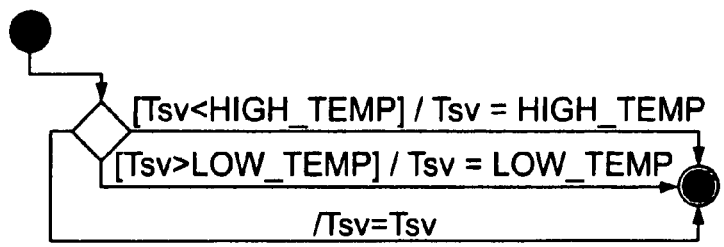
Figure 9D:
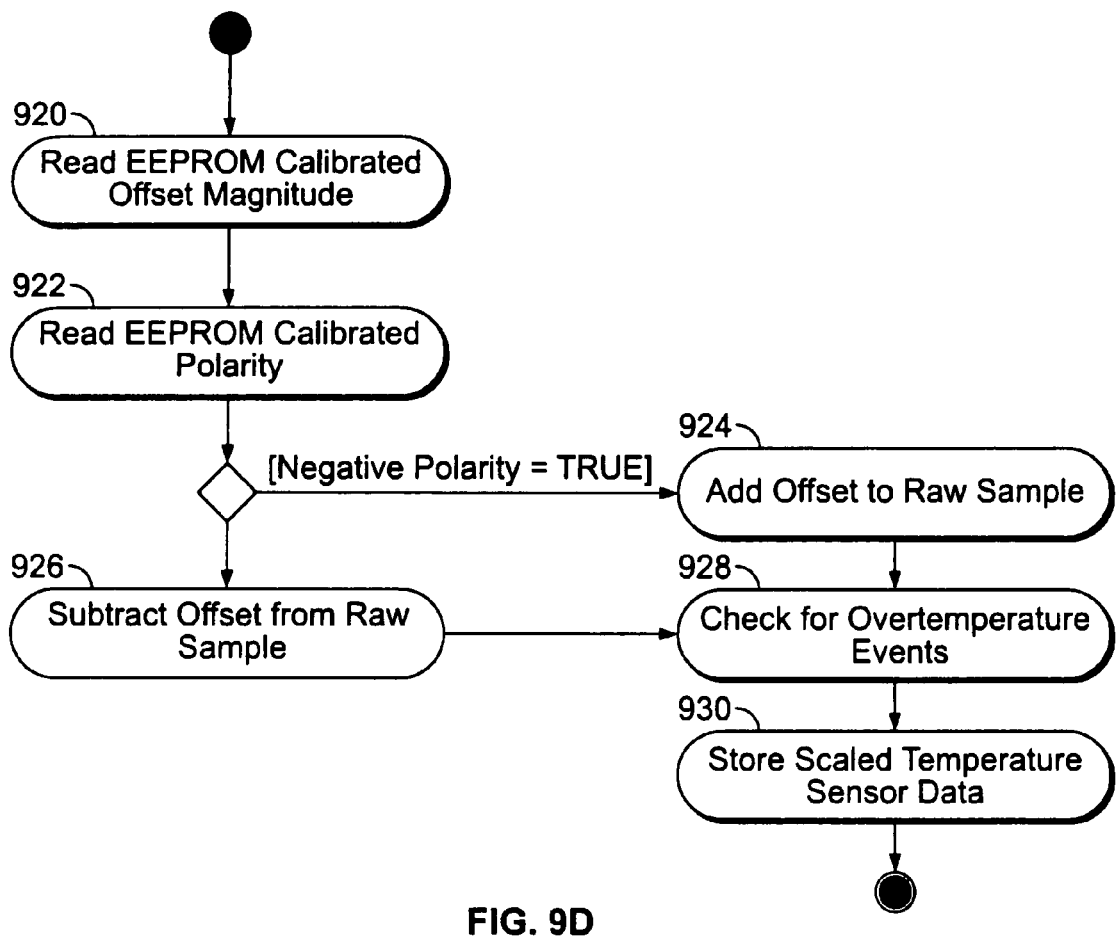

9B is a UML diagram of a get scaled temperature sensor data sequence shown in FIG. 9A;

FIG. 9C is a UML diagram of a range limit, scaled temperature sensor data sequence shown in FIG. 9B; and FIG. 9D is a UML diagram of a read raw temperature sensor data sequence shown in FIG. 9B.

DETAILED DESCRIPTION OF THE ILLUSTRATED EMBODIMENTS

Figure 1:
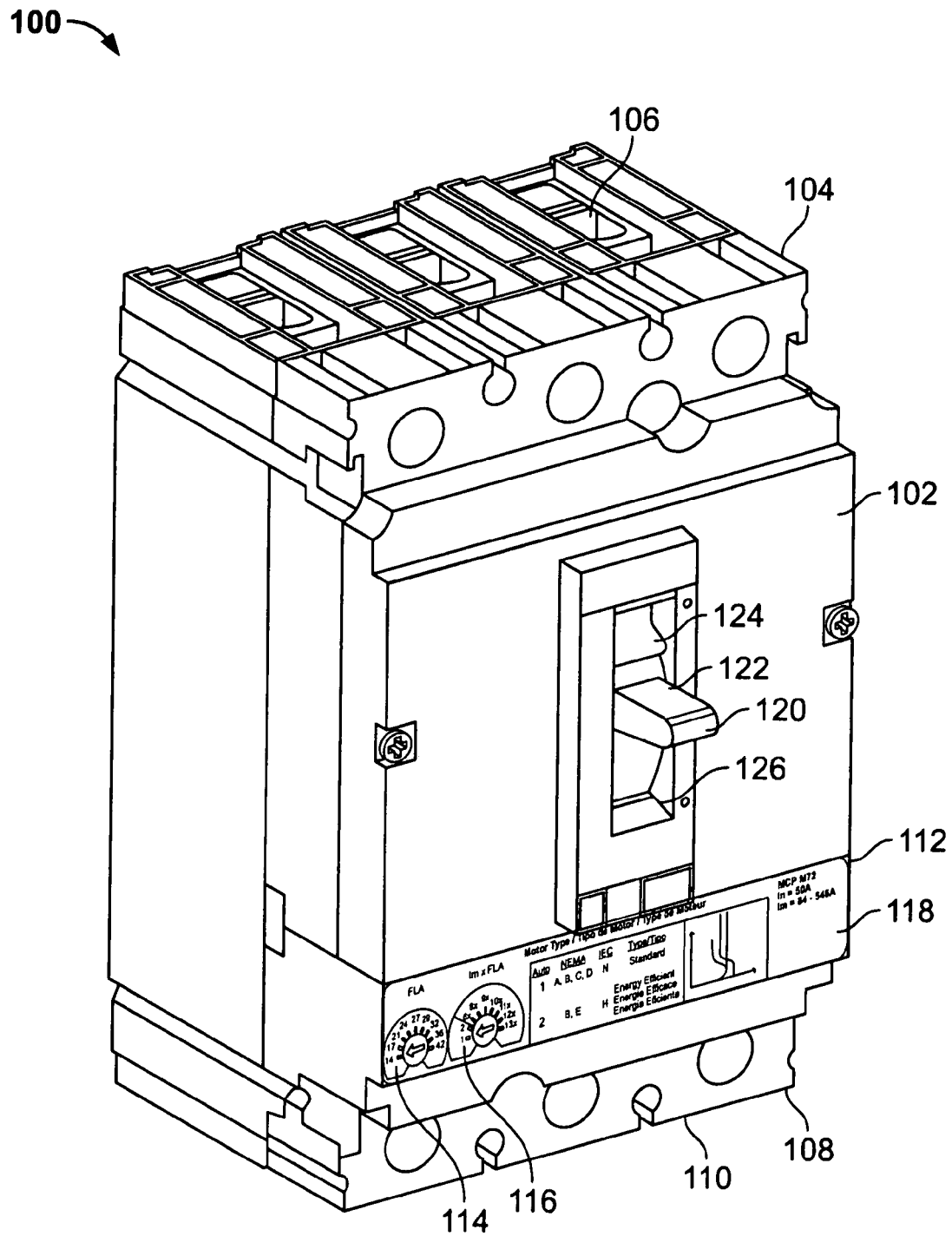
FIG. 1 is perspective view of a motor circuit protector according to the present application.

Turning now to FIG. 1, an electronic motor circuit protector 100 is shown. The motor circuit protector 100 includes a durable housing 102 including a line end 104 having line terminals 106 and a load end 108 having load lugs or terminals 110. The line terminals 106 allow the motor circuit protector 100 to be coupled to a power source and the load terminals 110 allow the motor circuit protector 100 to be coupled to an electrical load such as a motor as part of a motor control center ("MCC"). In this example the motor circuit protector 100 includes a three-phase circuit breaker with three poles, although the concepts described below may be used with circuit protectors with different numbers of poles, including a single pole.

The motor circuit protector 100 includes a control panel 112 with a full load ampere ("FLA") dial 114 and an instantaneous trip point ("$I_m$") dial 116 which allows the user to configure the motor circuit protector 100 for a particular type of motor to be protected within the rated current range of the motor circuit protector 100. The full load ampere dial 114 allows a user to adjust the full load which may be protected by the motor circuit protector 100. The instantaneous trip point dial 116 has settings for automatic protection (three levels in this example) and for traditional motor protection of a trip point from 8 to 13 times the selected full load amperes on the full load ampere dial 114. The dials 114 and 116 are located next to an instruction graphic 118 giving guidance to a user on the proper settings for the dials 114 and 116. In this example, the instruction graphic 118 relates to NEC recommended settings for the dials 114 and 116 for a range of standard motors. The motor circuit protector 100 includes a breaker handle 120 that is moveable between a TRIPPED position 122 (shown in FIG. 1), an ON position 124 and an OFF position 126. The position of the breaker handle 120 indicates the status of the motor circuit protector 100. For example, in order for the motor circuit protector 100 to allow power to flow to the load, the breaker handle 120 must be in the ON position 124 allowing power to flow through the motor circuit protector 100. If the circuit breaker is tripped, the breaker handle 120 is moved to the TRIPPED position 122 by a disconnect mechanism, causing an interruption of power and disconnection of downstream equipment. In order to activate the motor circuit protector 100 to provide power to downstream equipment or to reset the motor circuit protector 100 after tripping the trip mechanism, the breaker handle 120 must be moved manually from the TRIPPED position 120 to the OFF position 126 and then to the ON position 124.

Figure 2:
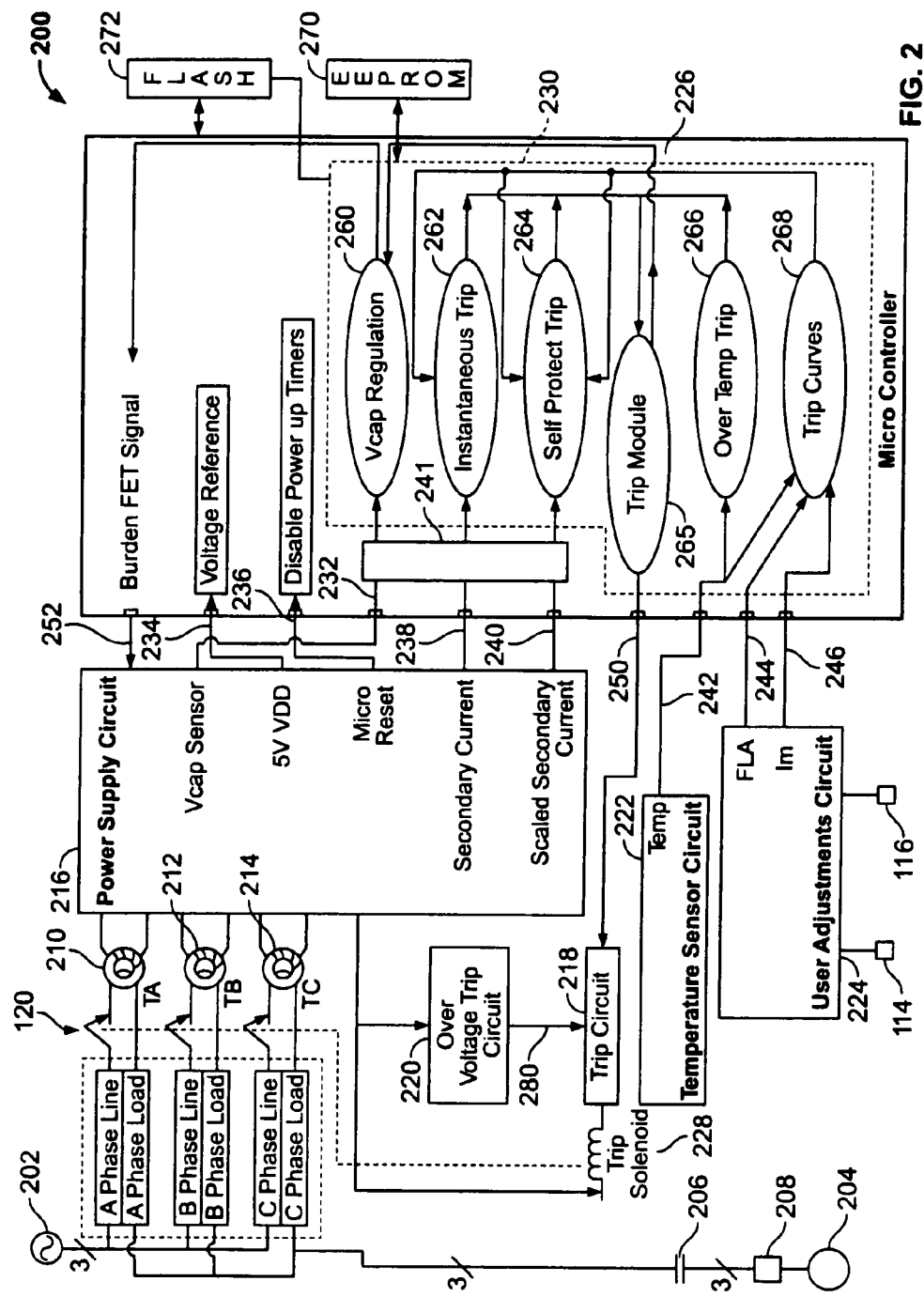
FIG. 2 is a functional block diagram of the motor circuit protector in FIG. 1.

FIG. 2 is a functional block diagram of the motor circuit protector 100 in FIG. 1 as part of a typical MCC configuration 200 coupled between a power source 202 and an electrical load such as a motor 204. The MCC configuration 200 also includes a contactor 206 and an overload relay 208 downstream from the power source 202. Other components such as a variable speed drive, start/stop switches, fuses, indicators and control equipment may reside either inside the MCC configuration 200 or outside the MCC configuration 200 between the power source 202 and the motor 204. The motor circuit protector 100 protects the motor 204 from a short circuit condition by actuating the trip mechanism, which causes the breaker handle 120 to move to the TRIPPED position when instantaneous short-circuit conditions are detected. The power source 202 in this example is connected to the three line terminals 106, which are respectively coupled to the primary windings of three current transformers 210, 212 and 214. Each of the current transformers 210, 212 and 214 has a phase line input and a phase load output on the primary winding. The current transformers 210, 212 and 214 correspond to phases A, B and C from the power source 202. The current transformers 210, 212 and 214 in this example are iron-core transformers and function to sense a wide range of currents. The motor circuit protector 100 provides instantaneous short-circuit protection for the motor 204.

The motor circuit protector 100 includes a power supply circuit 216, a trip circuit 218, an over-voltage trip circuit 220, a temperature sensor circuit 222, a user adjustments circuit 224, and a microcontroller 226. In this example, the microcontroller 226 is a PIC16F684-E/ST programmable microcontroller, available from Microchip Technology, Inc. based in Chandler, Ariz., although any suitable programmable controller, microprocessor, processor, etc. may be used. The microcontroller 226 includes current measurement circuitry 241 that includes a comparator and an analog-to-digital converter. The trip circuit 218 sends a trip signal to an electromechanical trip solenoid 228, which actuates a trip mechanism, causing the breaker handle 120 in FIG. 1 to move from the ON position 124 to the TRIPPED position 122, thereby interrupting power flow to the motor 204. In this example, the electro-mechanical trip solenoid 228 is a magnetic latching solenoid that is actuated by either stored energy from a discharging capacitor in the power supply circuit 216 or directly from secondary current from the current transformers 210, 212 and 214.

The signals from the three current transformers 210, 212 and 214 are rectified by a conventional three-phase rectifier circuit (not shown in FIG. 2), which produces a peak secondary current with a nominally sinusoidal input. The peak secondary current either fault powers the circuits 216, 218, 220, 222, and 224 and the microcontroller 226, or is monitored to sense peak fault currents. The default operational mode for current sensing is interlocked with fault powering as will be explained below. A control algorithm 230 is responsible for, inter alia, charging or measuring the data via analog signals representing the stored energy voltage and peak current presented to configurable inputs on the microcontroller 226. The control algorithm 230 is stored in a memory that can be located in the microcontroller 226 or in a separate memory device 272, such as a flash memory. The control algorithm 230 includes machine instructions that are executed by the microcontroller 226. All software executed by the microcontroller 226 including the control algorithm 230 complies with the software safety standard set forth in UL-489 SE and can also be written to comply with IEC-61508. The software requirements comply with UL-1998. As will be explained below, the configurable inputs may be configured as analog-to-digital ("A/D") converter inputs for more accurate comparisons or as an input to an internal comparator in the current measurement circuitry 241 for faster comparisons. In this example, the A/D converter in the current measurement circuitry 241 has a resolution of 8/10 bits, but more accurate A/D converters may be used and may be separate and coupled to the microcontroller 226. The output of the temperature sensor circuit 222 may be presented to the A/D converter inputs of the microcontroller 226.

The configurable inputs of the microcontroller 226 include a power supply capacitor input 232, a reference voltage input 234, a reset input 236, a secondary current input 238, and a scaled secondary current input 240, all of which are coupled to the power supply circuit 216. The microcontroller 226 also includes a temperature input 242 coupled to the temperature sensor circuit 222, and a full load ampere input 244 and an instantaneous trip point input 246 coupled to the user adjustments circuit 224. The user adjustments circuit 224 receives inputs for a full load ampere setting from the full load ampere dial 114 and either a manual or automatic setting for the instantaneous trip point from the instantaneous trip point dial 116.

The microcontroller 226 also has a trip output 250 that is coupled to the trip circuit 218. The trip output 250 outputs a trip signal to cause the trip circuit 218 to actuate the trip solenoid 228 to trip the breaker handle 120 based on the conditions determined by the control algorithm 230. The microcontroller 226 also has a burden resistor control output 252 that is coupled to the power supply circuit 216 to activate current flow across a burden resistor (not shown in FIG. 2) and maintain regulated voltage from the power supply circuit 216 during normal operation.

The breaker handle 120 controls manual disconnect operations allowing a user to manually move the breaker handle 120 to the OFF position 126 (see FIG. 1). The trip circuit 218 can cause a trip to occur based on sensed short circuit conditions from either the microcontroller 226, the over-voltage trip circuit 220 or by installed accessory trip devices, if any. As explained above, the microcontroller 226 makes adjustment of short-circuit pickup levels and trip-curve characteristics according to user settings for motors with different current ratings. The current path from the secondary output of the current transformers 210, 212, 214 to the trip solenoid 228 has a self protection mechanism against high instantaneous fault currents, which actuates the breaker handle 120 at high current levels according to the control algorithm 230.

The over-voltage trip circuit 220 is coupled to the trip circuit 218 to detect an over-voltage condition from the power supply circuit 216 to cause the trip circuit 218 to trip the breaker handle 120 independently of a signal from the trip output 250 of the microcontroller 226. The temperature sensor circuit 222 is mounted on a circuit board proximate to a copper burden resistor (not shown in FIG. 2) together with other electronic components of the motor circuit protector 100. The temperature sensor circuit 222 and the burden resistor are located proximate each other to allow temperature coupling between the copper traces of the burden resistor and the temperature sensor. The temperature sensor circuit 222 is thermally coupled to the power supply circuit 216 to monitor the temperature of the burden resistor. The internal breaker temperature is influenced by factors such as the load current and the ambient temperatures of the motor circuit protector 100. The temperature sensor 222 provides temperature data to the microcontroller 226 to cause the trip circuit 218 to actuate the trip solenoid 228 if excessive heat is detected. The output of the temperature sensor circuit 222 is coupled to the microcontroller 226, which automatically compensates for operation temperature variances by automatically adjusting trip curves upwards or downwards.

The microcontroller 226 first operates the power supply circuit 216 in a startup mode when a reset input signal is received on the reset input 236. A charge mode provides voltage to be stored for actuating the trip solenoid 228. After a sufficient charge has been stored by the power supply circuit 216, the microcontroller 226 shifts to a normal operation mode and monitors the power supply circuit 216 to insure that sufficient energy exists to power the electro-mechanical trip solenoid 228 to actuate the breaker handle 120. During each of these modes, the microcontroller 226 and other components monitor for trip conditions.

The control algorithm 230 running on the microcontroller 226 includes a number of modules or subroutines, namely, a voltage regulation module 260, an instantaneous trip module 262, a self protection trip module 264, an over temperature trip module 266 and a trip curves module 268. The modules 260, 262, 264, 266 and 268 generally control the microcontroller 226 and other electronics of the motor circuit protector 100 to perform functions such as governing the startup power, establishing and monitoring the trip conditions for the motor circuit protector 100, and self protecting the motor circuit protector 100. A storage device 270, which in this example is an electrically erasable programmable read only memory (EEPROM), is coupled to the microcontroller 226 and stores data accessed by the control algorithm 230 such as trip curve data and calibration data as well as the control algorithm 230 itself. Alternately, instead of being coupled to the microcontroller 226, the EEPROM may be internal to the microcontroller 226.

Figure 3:
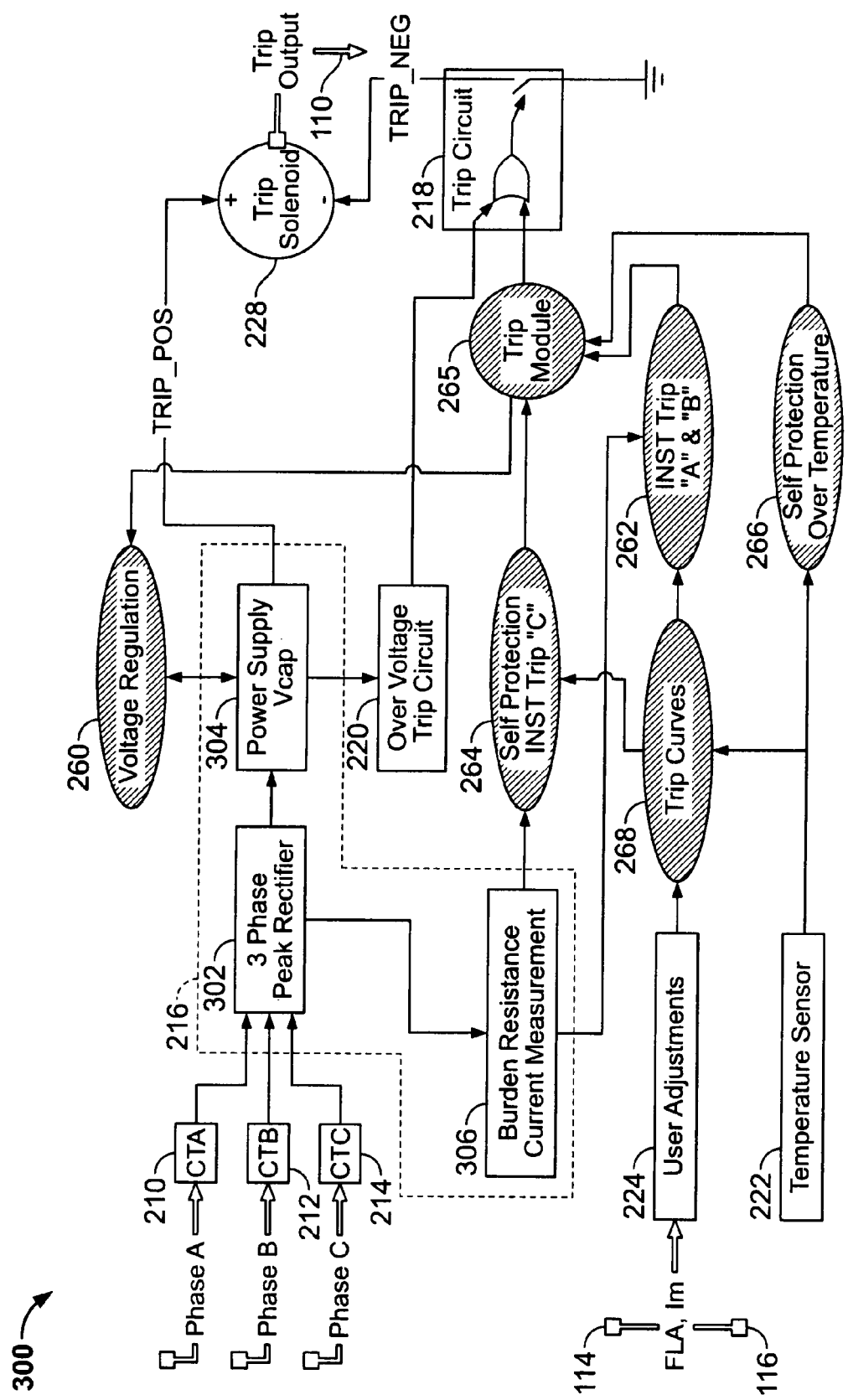
FIG. 3 is a functional block diagram of the operating components of a control algorithm of the motor circuit protector in FIG. 1.

FIG. 3 is a functional block diagram 300 of the interrelation between the hardware components shown in FIG. 2 and software/firmware modules 260, 262, 264, 266 and 268 of the control algorithm 230 run by the microcontroller 226. The secondary current signals from the current transformers 210, 212 and 214 are coupled to a three-phase rectifier 302 in the power supply circuit 216. The secondary current from the three-phase rectifier 302 charges a stored energy circuit 304 that supplies sufficient power to activate the trip solenoid 228 when the trip circuit 218 is activated. The voltage regulation module 260 ensures that the stored energy circuit 304 maintains sufficient power to activate the trip solenoid 228 in normal operation of the motor circuit protector 100.

The trip circuit 218 may be activated in a number of different ways. As explained above, the over-voltage trip circuit 220 may activate the trip circuit 218 independently of a signal from the trip output 250 of the microcontroller 226. The microcontroller 226 may also activate the trip circuit 218 via a signal from the trip output 250, which may be initiated by the instantaneous trip module 262, the self protection trip module 264, or the over temperature trip module 266. For example, the instantaneous trip module 262 of the control algorithm 230 sends a signal from the trip output 250 to cause the trip circuit 218 to activate the trip solenoid 228 when one of several regions of a trip curve are exceeded. For example, a first trip region A is set just above a current level corresponding to a motor locked rotor. A second trip region B is set just above a current level corresponding to an in-rush current of a motor. The temperature sensor circuit 222 outputs a signal indicative of the temperature, which is affected by load current and ambient temperature, to the over temperature trip module 266. The over temperature trip module 266 will trigger the trip circuit 218 if the sensed temperature exceeds a specific threshold. For example, load current generates heat internally by flowing through the current path components, including the burden resistor, and external heat is conducted from the breaker lug connections. A high fault current may cause the over temperature trip module 266 to output a trip signal 250 (FIG. 2) because the heat conducted by the fault current will cause the temperature sensor circuit 222 to output a high temperature. The over temperature trip module 266 protects the printed wire assembly from excessive temperature buildup that can damage the printed wire assembly and its components. Alternately, a loose lug connection may also cause the over temperature trip module 266 to output a trip signal 250 if sufficient ambient heat is sensed by the temperature sensor circuit 222.

The trip signal 250 is sent to the trip circuit 218 to actuate the solenoid 228 by the microcontroller 226. The trip circuit

218 may actuate the solenoid 228 via a signal from the over-voltage trip circuit 220. The requirements for "Voltage Regulation," ensure a minimum power supply voltage for "Stored Energy Tripping." The trip circuit 218 is operated by the microcontroller 226 either by a "Direct Drive" implementation during high instantaneous short circuits or by the control algorithm 230 first ensuring that a sufficient power supply voltage is present for the "Stored Energy Trip." In the case where the "Stored Energy" power supply voltage has been developed, sending a trip signal 250 to the trip circuit 218 will ensure trip activation. During startup, the power supply 216 may not reach full trip voltage, so a "Direct Drive" trip operation is required to activate the trip solenoid 228. The control for Direct Drive tripping requires a software comparator output sense mode of operation. When the comparator trip threshold has been detected, the power supply charging current is applied to directly trip the trip solenoid 228, rather than waiting for full power supply voltage.

The over-voltage trip circuit 220 can act as a backup trip when the system 200 is in "Charge Mode." The control algorithm 230 must ensure "Voltage Regulation," so that the over-voltage trip circuit 220 is not inadvertently activated. The default configuration state of the microcontroller 226 is to charge the power supply 216. In microcontroller control fault scenarios where the power supply voltage exceeds the over voltage trip threshold, the trip circuit 218 will be activated. Backup Trip Levels and trip times are set by the hardware design.

The user adjustments circuit 224 accepts inputs from the user adjustment dials 114 and 116 to adjust the motor circuit protector 100 for different rated motors and instantaneous trip levels. The dial settings are converted by a potentiometer to distinct voltages, which are read by the trip curves module 268 along with temperature data from the temperature sensor circuit 222. The trip curves module 268 adjusts the trip curves that determine the thresholds to trigger the trip circuit 218. A burden circuit 306 in the power supply circuit 216 allows measurement of the secondary current signal, which is read by the instantaneous trip module 262 from the peak secondary current analog-to-digital input 238 (shown in FIG. 2) along with the trip curve data from the trip curves module 268. The self-protection trip module 264 also receives a scaled current (scaled by a scale factor of the internal comparator in the current measurement circuitry 241) from the burden resistor in the burden circuit 306 to determine whether the trip circuit 218 should be tripped for self protection of the motor circuit protector 100. In this example, fault conditions falling within this region of the trip curve are referred to herein as falling within region C of the trip curve.

As shown in FIGS. 2 and 3, a trip module 265 is coupled between the trip circuit 218 and the voltage regulation module 260. Trip signals from the instantaneous trip module 262, the self protection trip module 264, and the over temperature trip module 266 are received by the trip module 265.

The following terms may be used herein:

DIRECT DRIVE—Initiating a trip sequence using the secondary current from the current transformer 210, 212, 214 to energize the trip solenoid 228 rather than using energy stored in the stored energy circuit 304. A direct drive sequence can be carried out prior to or after achieving a stored energy trip voltage.

STORED ENERGY TRIP—Sending a trip sequence with knowledge of the stored energy trip voltage on the power supply voltage, $V_{CAP}$, 304 using the energy stored in the stored energy circuit 304 to energize the trip solenoid 228.

REDUNDANT TRIP OUTPUT—Send both "trip output" to the trip circuit 218 and "FET off" output to the power supply circuit 216 if the digital trip output was not successful. This will eventually cause the over-voltage circuit 220 to activate the trip solenoid 228.

OVER-VOLTAGE TRIP BACKUP—A trip sequence that uses the over-voltage trip circuit 220 to trip the breaker. This sequence is a backup for the normal "trip circuit" method. This sequence can be activated later in time due to a higher $V_{CAP}$ 304 activation voltage.

Figure 4:
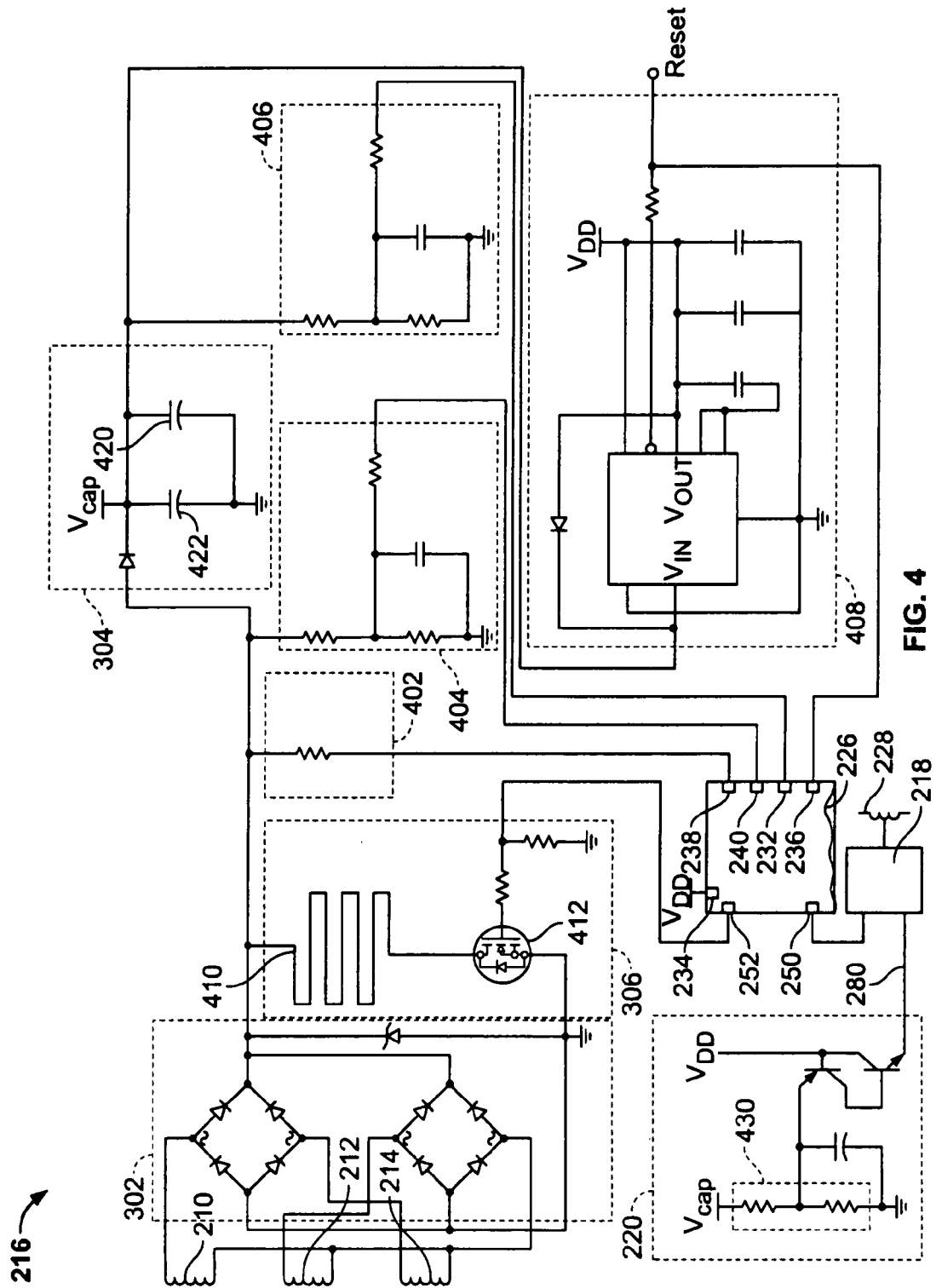
FIG. 4 is a circuit diagram of some of the circuits including the stored energy circuit of the motor circuit protector in FIG. 1.

FIG. 4 is a detailed circuit diagram of various circuits of the motor circuit protector 100, including the power supply circuit 216 and other related components including the stored energy circuit 304, the burden circuit 306, a scaled current comparator current input 404, an energy storage capacitor voltage input circuit 406, and a voltage regulator circuit 408. The power supply circuit 216 derives the secondary current from the secondary windings of the three current transformers 210, 212, and 214, which are rectified by the three-phase rectifier 302. The output of the three-phrase rectifier 302 is coupled to the burden circuit 306, which is coupled in parallel to the stored energy circuit 304. The power supply circuit 216 also includes a peak current input circuit 402 that is provided to the microcontroller 226, a scaled current comparator input circuit 404 that is provided to the comparator of the current measurement circuitry 241 of the microcontroller 226 via the scaled secondary current input 240, a stored energy capacitor voltage input circuit 406 and a voltage regulator circuit 408. The stored energy capacitor input 232 of the microcontroller 226 is coupled to the stored energy capacitor input circuit 406, the reference voltage input 234 is coupled to the voltage regulator circuit 408, the secondary current input 238 is coupled to the peak current input circuit 402, and the scaled secondary current input 240 is coupled to the scaled current comparator input circuit 404.

The burden circuit 306 includes a burden resistor 410 connected in series with a burden resistor control field effect transistor (FET) 412. The gate of the burden resistor control FET 412 is coupled to the burden resistor control output 252 of the microcontroller 226. Turning on the burden resistor control FET 412 creates a voltage drop across the burden resistor 410 and the burden resistor control FET 412 allowing measurement of the secondary current for fault detection purposes. The voltage drop may also provide an indication of current available to charge the stored energy circuit 304.

The secondary current from the rectifier 302 is measured by the peak current input circuit 402 and the scaled current comparator input circuit 404. The stored energy circuit 304 includes two energy storage capacitors 420 and 422. The energy storage capacitors 420 and 422 are charged by the secondary current when the burden resistor control FET 412 is switched off and are discharged by the trip circuit 218 to actuate the trip solenoid 228 in FIG. 2.

The scaled current comparator input circuit 404 has an input that is coupled to the rectifier 302. The scaled current comparator input circuit 404 includes a voltage divider to scale down the signal from the rectifier 302 and is coupled to the scaled secondary current input 240 of the microcontroller 226. The voltage regulator circuit 408 provides a component power supply (in this example, 5 volts nominal) to the electronic components such as the microcontroller 226 in the motor circuit protector 100. The microcontroller 226 includes two internal comparators in the current measurement circuitry 241 that may compare the input 232 or the input 240 with a reference voltage that is received from the voltage regulator circuit 408 to the reference voltage input 234. The reference voltage is also a reference voltage level when the inputs 232 and 240 are configured to be coupled to analog-to-digital converters. When the internal comparator is switched to receive the input 240 to the self protection trip module 264, the peak current is scaled for the comparator input by external hardware such as the scaled current comparator input circuit 404. An internal comparator reference is set by the microcontroller 226 to control the comparator trip thresholds.

The stored energy capacitor voltage input circuit 406 includes the parallel-connected capacitors 420 and 422 and measures the voltage level of the stored energy circuit 304, which is indicative of the stored energy in the capacitors 420 and 422. The stored energy capacitor voltage input circuit 406 provides a signal indicative of the voltage on the capacitors 420 and 422 to the stored energy capacitor input 232 of the microcontroller 226 to monitor the voltage of the stored energy circuit 304.

Upon startup of the motor circuit protector 100 (such as when the user throws the breaker handle 120 to the ON position), the voltage regulator circuit 408 and the microcontroller 226 receive a reset signal from the power supply circuit 216 and the rectifier 302 begins to charge the capacitors 420 and 422. A start-up delay time including a hardware time delay and a fixed software time delay elapses. The hardware time delay is dependent on the time it takes the secondary current to charge the stored energy circuit 304 to a voltage sufficient to operate the voltage regulator circuit 408. In this example, the voltage regulator circuit 408 needs a minimum of 5 volts (nominal) to operate. The fixed software time delay is the time required for stabilization of the regulated component voltage from the voltage regulator circuit 408 to drive the electronic components of the motor circuit protector 100. The software delay time is regulated by an internal timer on the microcontroller 226. The overall start-up delay time typically covers the first half-cycle of the current.

After the start-up delay time, the microcontroller 226 executes the control algorithm 230, which is optionally stored in the internal memory of the microcontroller 226, and enters a "Self Protection" measurement mode, which relies upon the internal comparator of the microcontroller 226 for rapid detection of fault currents. The microcontroller 226 turns on the burden resistor control FET 412 allowing measurement of the secondary current. The burden resistor control FET 412 is turned on for a fixed period of time regulated by the internal timer on the microcontroller 226. The voltage regulation module 260 configures the microcontroller 226 to couple the scaled secondary current input 240 to an input to the internal comparator of the microcontroller 226. The scaled secondary current input 240 reads the signal from the scaled peak current input circuit 404, which measures the secondary current from the rectifier 302 and requires minimal initializing overhead. The peak current from the secondary current is predicted via the secondary current detected by the scaled current comparator input circuit 404.

The internal comparator in the microcontroller 226 is a relatively fast device (compared to, for example, an A/D converter, which may be more accurate but operates more slowly) and thus can detect fault currents quickly while in this mode. If the peak current exceeds a threshold level, indicating a fault current, the burden resistor control FET 412 is turned off by a signal from the burden resistor control output 252 of the microcontroller 226, and the trip signal 250 is sent to the trip circuit 218. The threshold level is set depending on the desired self-protection model of the range of currents protected by the particular type of motor circuit protector 100. The disconnection of the FET 412 causes the fault current to rapidly charge the capacitors 420 and 422 of the stored energy circuit 304 and actuate the trip solenoid 228 to trip the trip mechanism of the motor circuit protector 100, which is visually indicated by the breaker handle 120.

After the initial measurement is taken, the control algorithm 230 enters into a charge only mode of operation in order to charge the capacitors 420 and 422 of the stored energy circuit 304. The control algorithm 230 sends a signal to turn off the burden resistor control FET 412, causing the capacitors 420 and 422 to be charged. The control algorithm 230 remains in the charge only mode until sufficient energy is stored in the stored energy circuit 304 to actuate the trip solenoid 228 in the event of a detected fault condition. In the charge only mode, the voltage regulation module 260 configures the microcontroller 226 to take a voltage input from the peak current input circuit 402 to the secondary current input 238, which is configured for an analog to digital converter. The signal from the secondary current input 238 analog to digital conversion is more accurate then the internal comparator but relatively slower. During the charge only mode, if a fault current occurs, the stored energy circuit 304 is charged quickly and the fault current actuates the trip solenoid 228 therefore providing self protection.

It should be noted that the control algorithm 230 can be programmed to multiplex current measurement for self-protection sensing and power-supply charging for minimum stored-energy tripping.

The voltage regulation module 260 also configures the internal comparator in the current measurement circuitry 241 to be connected to the stored energy capacitor voltage input circuit 406 via the capacitor voltage input 232 to detect voltage levels from the stored energy circuit 304. The voltage regulation module 260 thus maintains real time monitoring over the regulated voltage output from the stored energy circuit 304 while performing other software tasks such as monitoring fault currents.

During the charge only mode, the control algorithm 230 charges the stored energy circuit 304 from the minimum voltage regulation level (5 volts in this example from the hardware startup period) to a voltage level (15 volts in this example) indicative of sufficient energy to actuate the trip solenoid 228. The charging of the capacitors 420 and 422 is regulated by the voltage regulation module 260, which keeps the burden resistor control FET 412 off via the burden resistor control output 252 causing the capacitors 420 and 422 to charge. The voltage regulation module 260 holds the stored energy circuit 304 in the charge mode until a start voltage threshold level (15 volts in this example) is reached for the supply voltage from the stored energy circuit 304 and is thus sensed through the stored energy capacitor voltage input circuit 406. The timing of when the start voltage threshold level is reached depends on the secondary current from the rectifier 302 to the stored energy circuit 304. The ability of the voltage regulation module 260 to hold the charge mode allows designers to avoid external stability hardware components. This process reduces peak overshoot during high instantaneous startup scenarios while charging the capacitors 420 and 422 to the start voltage threshold level more efficiently.

Once the minimum energy for actuating the trip solenoid 228 is stored, the control algorithm 230 proceeds to a steady state or run mode. In the run mode, the control algorithm 230 maintains control of the voltage from the stored energy circuit 304 with the voltage regulation module 260 after the sufficient energy has been stored for tripping purposes. The voltage regulation module 260 maintains a voltage above the stored energy trip voltage by monitoring the voltage from the stored energy circuit 304 from the stored energy capacitor voltage input circuit 406 to the stored energy capacitor input 232. The stored energy capacitor input 232 is internally configured as an A/D converter input for more accurate voltage level sensing for the run mode.

The voltage regulation module 260 also regulates the stored energy circuit 304 and avoids unintended activation of the over-voltage trip circuit 220. The power supply regulation task is serviced in the run mode on a periodic basis to maintain the necessary energy in the stored energy circuit 304. The regulation task may be pre-empted to service higher priority tasks such as the trip modules 262 and 264. In the run mode, the voltage regulation module 260 monitors the voltage from the stored energy circuit 304. The voltage regulation module 260 maintains the voltage output from the stored energy circuit 304 above the backup trip set points, which include a high set point voltage and a low set point voltage. If the energy falls below a high set point voltage threshold (14.7 volts in this example), the voltage regulation module 260 initiates fixed width charge pulses, by sending control signals via the burden resistor control output 252 to the burden resistor control FET 412 to turn on and off until a high voltage set point for the power supply voltage is reached. The width of the pulse corresponds with the maximum allowable voltage ripple at the maximum charge rate of the stored energy circuit 304. The number of fixed width charge pulses is dependent on the voltage level from the stored energy circuit 304. If the energy is above the high set point voltage, the voltage regulation module 260 will not initiate fixed width charge pulse in order to avoid unintended activation of the over-voltage trip circuit 220.

If the voltage signals detected from the stored energy capacitor voltage input circuit 406 are such that the microcontroller 226 cannot maintain regulation voltage on the stored energy circuit 304, a threshold voltage low set point (13.5 volts in this example) for the stored energy circuit 304 is reached and the control algorithm 230 will charge the stored energy circuit 304 to reach a minimum voltage necessary for trip activation of the trip solenoid 228. The microcontroller 226 will restart the charge mode to recharge the capacitors 420 and 422 in the stored energy circuit 304. During the charging process, fault current measurement is disabled, however if a fault current of significant magnitude occurs, the fault current will rapidly charge the capacitors 420 and 422 of the measured stored energy circuit 304 and thus overall trip performance is not affected. The application will also restart when the watchdog timer in the microcontroller 226 resets.

In the run mode, the microcontroller 226 is in measurement mode by keeping the burden resistor control FET 412 on. The microcontroller 226 monitors the secondary current via the secondary current input 238, which is configured as an analog-to-digital converter for more accurate measurements. The instantaneous trip module 262 sends an interrupt signal from the trip output 250 of the microcontroller 226 to cause the trip circuit 218 to activate the trip solenoid 228 for conditions such as a motor in-rush current or a locked motor rotor (trip conditions A and B), which cause a trip curve to be exceeded based on the secondary current. The internal comparator of the microcontroller 226 is configured to accept an input from the scaled secondary current input 240, which is read by the self protection trip module 264 to determine whether the trip circuit 218 should be tripped for self protection of the motor circuit protector 100 in the case of high instantaneous current (trip condition C) detected from the faster measurement of the comparator. As explained above, the trip conditions for self protection are a function of the user settings from the dials 114 and 116.

In case of a failure of the microcontroller 226 to send the appropriate trip signal 250, the solenoid 228 is triggered by the over voltage trip circuit 220 (shown schematically in FIG. 4). The over voltage trip circuit 220 includes a voltage divider 430, which steps down the voltage level. In this example, pull up transistors cause the over voltage trip circuit 220 to send a discrete trip signal 280 to the trip circuit 218, causing the trip circuit 218 to actuate the trip solenoid 228 to trip the breaker handle 120.

Figure 5A:
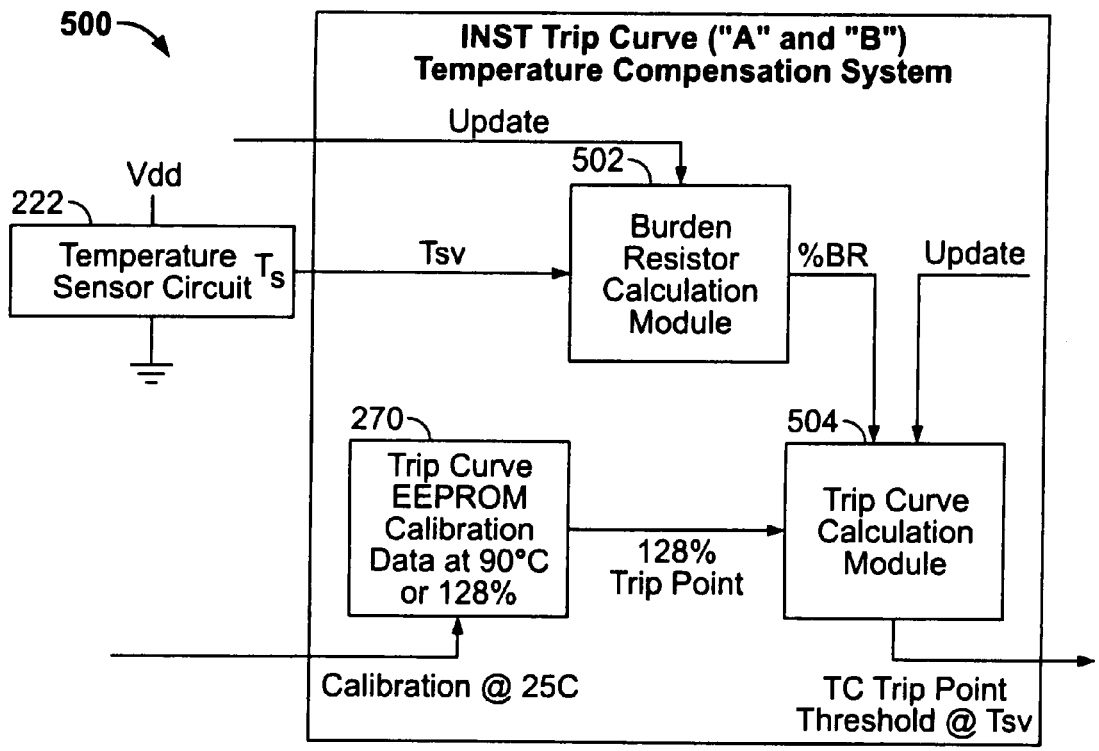
FIG. 5A is a functional block diagram of a temperature compensation system according to aspects of the various embodiments disclosed herein.
Figure 5B:
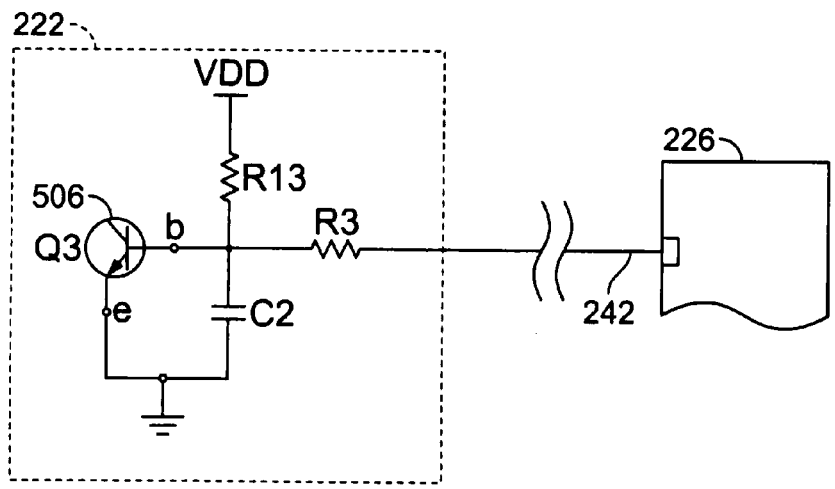
FIG. 5B is a functional circuit schematic for a temperature sensor coupled to the microcontroller shown in FIG. 2.

FIG. 5A illustrates a temperature compensation system 500 according to aspects of the various embodiments disclosed herein. The temperature compensation system 500 automatically adjusts the trip curves for regions A and B (and not region C) based on fluctuations in environmental temperature sensed by the temperature sensor circuit 222. The temperature compensation system 500 includes a burden resistor calculation module 502 and a trip curve calculation module 504. The burden resistor calculation module 502 receives a scaled voltage signal, Tsv, from the temperature sensor circuit 222 indicative of temperature. The module 502 calculates a percentage operation point of the burden resistor relative to 100% at 25° C. (% BR) by exploiting two sensor relationships: (1) the base-emitter voltage equation of a bipolar transistor 506 (shown in FIG. 5B) in the temperature sensor circuit 222 as a function of temperature; and (2) the combined resistance of the burden resistor 410 and FET 412 as a function of temperature. These relationships are explained in more detail below. In general, the intersection of these two oppositely sloped curves (the temperature sensor curve and the burden resistance curve) occurs at a temperature inflection point, about which the resolution and range of the temperature sensor readings and burden resistor percentage readings are matched.

The burden resistor 410 is a serpentine, copper burden resistor on a printed circuit board. The burden resistor 410 is disposed near the temperature sensor 222 such that there is temperature coupling between the copper traces of the burden resistor 410 and the temperature sensor 222, which is a pnp transistor 506. The voltage output of the temperature sensor 222 represents the circuit board temperature and is scaled and presented to an analog-to-digital converter input of the microcontroller 226, which may be an 8-bit microcontroller such as a PIC16F684-E/ST programmable microcontroller available from Microchip Technology, Inc. based in Chandler, Ariz.

The trip curve calculation module 504 receives calibrated trip point data at 90° C. or 128% from the EEPROM 270. 90° C. represents the upper temperature range of the compensated burden resistor sensor, though it should be understood that this value is merely exemplary and other upper temperature thresholds may be selected depending upon the desired operation range. In general, the trip curve calculation module 504 adjusts the trip points upwards or downwards depending upon whether the temperature sensor reading falls above or below the temperature inflection point.

It is known that burden resistance increases generally linearly with temperature with a positive-going slope. The resistance here is determined from the resistance of the burden resistor 410 and the turn-on resistance of the FET 412. The slope of the curve depends upon the temperature coefficient for copper, which is approximately 4000 parts per million in this particular example. As mentioned above, the temperature sensor circuit 222 includes the pnp transistor 506 having a base-emitter voltage that varies with temperature. As the temperature increases, the base-emitter voltage of the pnp transistor 506 decreases, creating a negative-going slope. The nominal temperature sensor equation can be determined experimentally. In a specific aspect, the nominal temperature sensor equation can be expressed as follows:

$V_{be}(T) = -0.0021 * T + 0.6504$, where $V_{be}$ is the base-emitter voltage of the pnp transistor 506. The offset, 0.6504, is typical, but may have to be adjusted upwards or downwards to represent a nominal curve. The nominal slope (−0.0021) does not require compensation. If the burden resistance curve is superimposed over the temperature sensor curve, the two curves intersect at an inflection point, which in this very specific and non-limiting example is 51.3° C. While assumptions have to be made about the symmetry of the two curves before and after the inflection point, the inflection point is useful for efficiently converting the temperature sensor readings directly to burden resistance percentage values.

The burden resistor calculation module 502 calculates the percentage on the normalized burden resistance from the scaled temperature sensor voltage, Tsv. The resolution and range of temperature sensor readings and burden resistor percentage readings are matched about the temperature inflection point. A linear equation for temperature is converted to a linear equation for normalized burden resistance. The following exemplary table illustrates the various parameters and their values for converting the temperature curve to a corresponding burden resistance curve. Of course, it should be understood that the values provided in the following table are merely exemplary.

burden resistance is determined. Trip points A and B are stored in the EEPROM 270 at Ts_HIGH or BR_MAX (e.g., 90° C. or 128%). Trip curve initialization iterates a specified number of steps (27 in this non-limiting example) to match estimated burden resistance with actual burden resistance readings. The following table summarizes the parameters and their values involved in the trip curve initialization:

| Description | Parameter | Units | Value |
|---|---|---|---|
| Inflection Point of Temperature Sensor and Burden Resistance curves | Inflection_point | [° C.] | 51.3 |
| Low Operation Temperature | Ts_LOW | [° C.] | −35 |
| Low Operation Temperature | LOW_TEMP | [dec] | = Tsv(Ts_LOW) |
| High Operation Temperature | Ts_HIGH | [° C.] | 90 |
| High Operation Temperature | HIGH_TEMP | [dec] | = Tsv(Ts_HIGH) |
| Inflection Point of Temperature Sensor and Burden Resistance curves | TSV_INFLECTION_PT | [dec] | Tsv(Inflection_point) |
| Burden Resistance Curve A | BR_Curve_A(Tsv) | [dec] | (((TSV_INFLECTION_PT) − (Tsv − TSV_INFLECTION_PT))) |
| Burden Resistance Curve B | BR_Curve_B(Tsv) | [dec] | (((TSV_INFLECTION_PT) + (TSV_INFLECTION_PT − Tsv))) |
| Burden Resistance Curve | BR_Curve(Tsv) | | if Tsv_reading is below the inflection point BR_Curve(Tsv) = BR_Curve_A(Tsv) Otherwise BR_Curve(Tsv) = BR_Curve_B(Tsv) |
| Minimum Normalized Burden Resistance | BR_MIN | [dec] | = BR_Curve(LOW_TEMP) |
| Maximum Normalized Burden Resistance | BR_MAX | [dec] | = BR_Curve(HIGH_TEMP) |
| Temperature Sensor Voltage | Tsv(temperature) | [dec] | = Vbe(temperature) * FSc/FSv |
| Transistor Base Emitter Voltage | Vbe(temperature) | [Vdc] | = (−0.0021 * temperature + 0.6504) |
| Full Scale A/D Counts | FSc | [Counts] | 1023/0x3FF |
| Full Scale A/D Voltage | Fsv | [Vdc] | 5 (nominal) |

The trip curve calculation module 504 adjusts trip thresholds downwards in specified constant steps until an estimated

| Description | Parameter | Units | Value |
|---|---|---|---|
| Trip Curve Initialization Iterations | | [dec] | 27 |
| Burden Resistor Scale Factor | SF | [dec] | 6 |
| Burden Resistor Iteration Step | BR_STEP | [dec] | = BR_MAX |
| Initial Burden Resistor Estimate | BR_INIT_ESTIMATE | [dec] | = BR_MAX * $(2^{SF})$ |
| Trip Threshold A | A | [16 Bits Right Justified] | {Variable} {initialized to 90° C.} |
| Trip Threshold B | B | [16 Bits Right Justified] | {Variable} {initialized to 90° C.} |

-continued

| Description | Parameter | Units | Value |
|---|---|---|---|
| Threshold Step for "A" | A_STEP | [dec] | = (A@90C)/($2^{SF}$) |
| Threshold Step for "B" | B_STEP | [dec] | = (B@90C)/($2^{SF}$) |
| Burden Resistor Reading | BR | [16 Bits Right Justified] | {Variable} = [% BR] * ($2^{SF}$) |
| Burden Resistor Estimate | BR_estimate | [16 Bits Right Justified] | {Variable} {initialized to 90° C.} |

The following table illustrates the iteration adjustment logic as a function of the actual temperature or burden resistor readings:

| Logic Operation | Parameters | Units | Condition | Operations |
|---|---|---|---|---|
| Decrease Estimates | BR_estimate A B | [dec] | If "BR_estimate" is greater than "BR" | BR_estimate = BR_estimate − BR_STEP A = A − A_STEP B = B − B_STEP |
| Increase Estimates | BR_estimate A B | [dec] | If "BR_estimate" is less than "BR" | BR_estimate = BR_estimate + BR_STEP A = A + A_STEP B = B + B_STEP |

The temperature sensor 222 may have an internal offset that is known at calibration time. Temperature sensors from one to another may vary, and temperature calibration values can be stored to add or subtract the internal offset so that the output of the temperature sensor 222 mimics a true nominal sensor. For example, a temperature sensor 222 outputting high readings relative to nominal can be corrected as follows. Suppose the temperature sensor 222 outputs at 25° C. 0.3812 volts corresponding to an A/D value of 78 [dec]. A nominal sensor would read 0.5962 volts or 122 [dec]. The temperature compensation algorithm would add 0.215 volts or 44 [dec] to every sensor reading to calibrate the low-reading temperature sensor to a nominal sensor. A temperature sensor 222 outputting high readings relative to nominal can be corrected as follows. Suppose the temperature sensor 222 outputs at 25° C. 0.7917 volts corresponding to an A/D value of 162 [dec]. The temperature compensation algorithm would subtract 0.1955 volts or 40 [dec] to every sensor reading to calibrate the high-reading temperature sensor to a nominal sensor. The temperature calibration value that would be stored, for example, in the EEPROM 270, is −40 [dec] or −0xA8 [hex].

Figure 6:
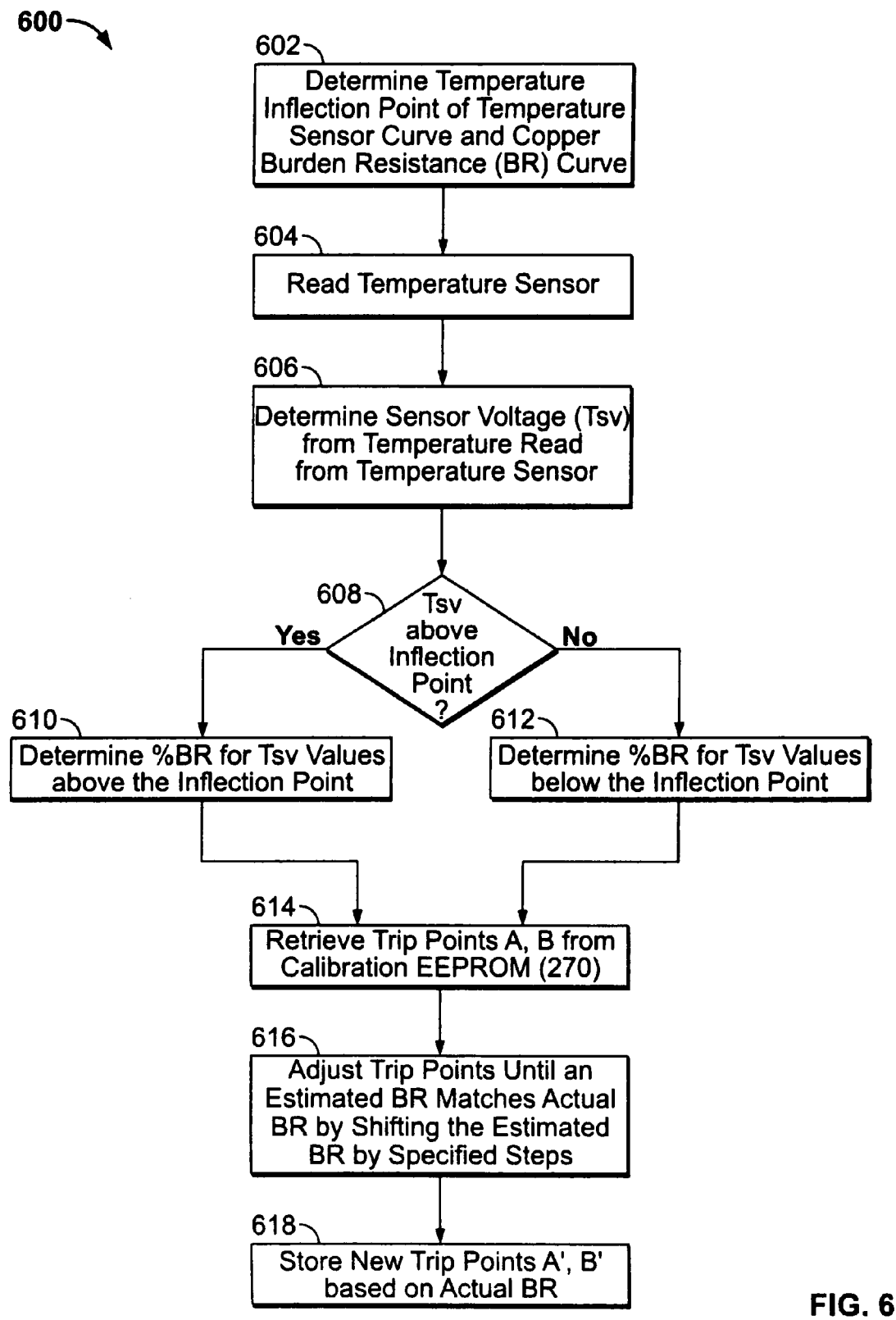
FIG. 6 is a flow chart diagram of an automatic temperature compensation method according to some aspects of the various embodiments disclosed herein.

FIG. 6 is a flow chart diagram of an exemplary temperature compensation algorithm 600 of the temperature compensation system 500 according to various embodiments disclosed herein. The algorithm 600 is implemented as machine instructions executed by the microcontroller 226. The algorithm 600 determines the temperature inflection point, Inflection_Point, corresponding to the intersection of the temperature sensor curve and the burden resistance curve (602). As noted above, the burden resistance includes the resistance of the burden resistor 410 and the resistance of the FET 412. The temperature sensor 222 is read (604). The algorithm 600 determines the scaled sensor voltage Tsv from the temperature read by the temperature sensor 222 (606). The algorithm 600 may offset the scaled value Tsv by a temperature calibration to calibrate the scaled readings to a nominal sensor output. The algorithm 600 determines whether Tsv is above the inflection point (608). If so, the algorithm 600 determines the % BR for the Tsv value above the inflection point (610); otherwise it determines the % BR for the Tsv value below the inflection point (612). The algorithm 600 retrieves trip points A and B from the calibration EEPROM 270 (614), which correspond to trip point settings at the upper temperature range or 90° C. (128%). The trip points are adjusted downward until an estimated BR matches the actual BR by shifting the estimated BR in specified steps (616). When a match is found, the new trip points A' and B' at the actual BR are stored (618).

Figure 7:
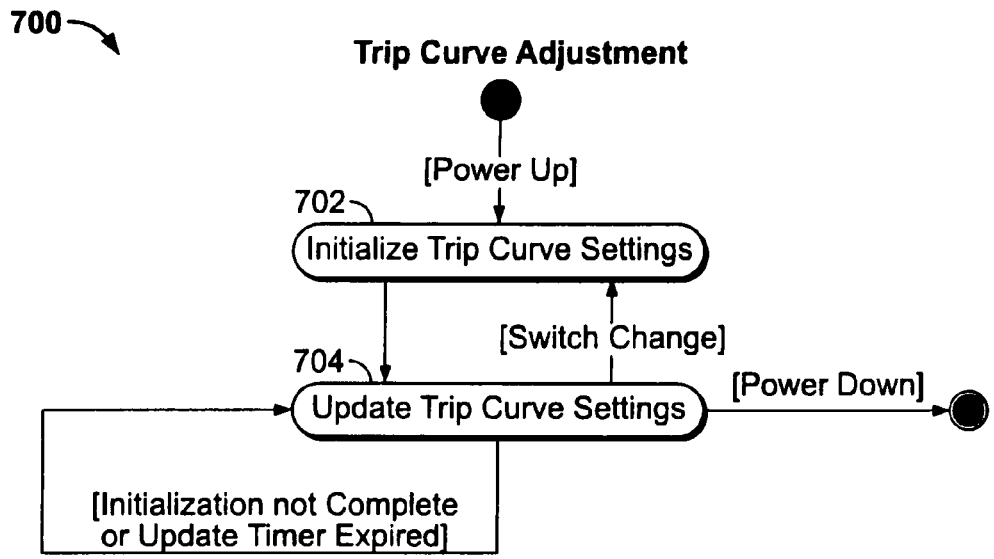
FIG. 7 is a Unified Modeling Language (UML) diagram of a trip curve adjustment sequence.

FIGS. 7, 8A-8B, and 9A-9D are activity and sequence diagrams expressed in Unified Modeling Language (UML). In FIG. 7, a trip curve adjustment activity diagram 700 is shown. Upon power up of the MCP 100, the microcontroller 226 initializes trip curve settings (702) and then updates the trip curve settings (704). If there is a change in the switches 114, 116, the trip curve settings are initialized to the trip points for the switch combination pair (702).

Figure 8A:
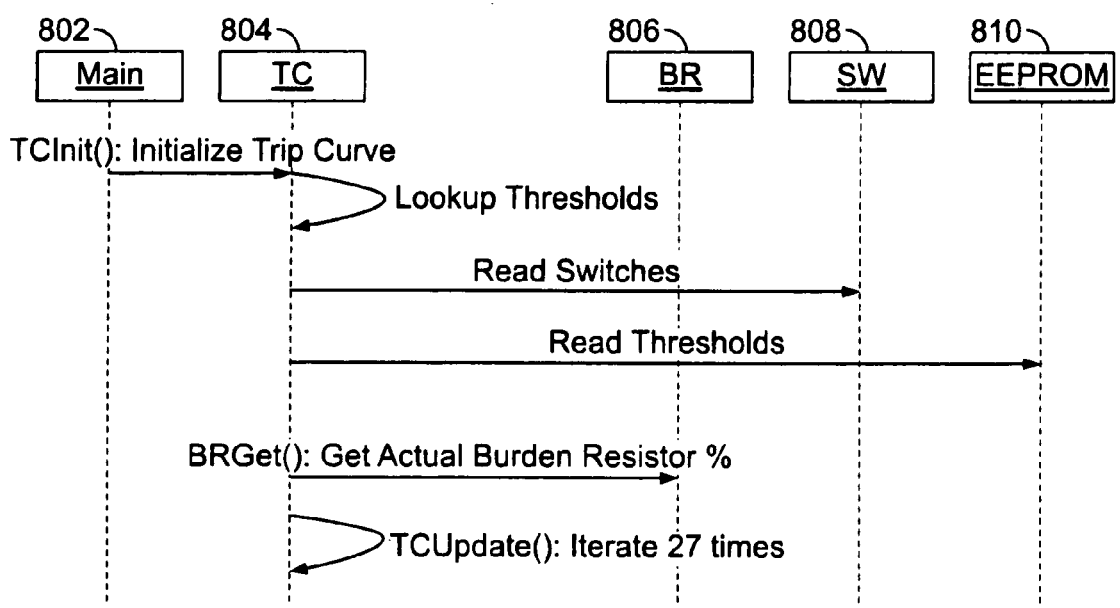
FIG. 8A is a UML sequence diagram of a trip curve initialization sequence shown in FIG. 7.

FIG. 8A is a trip curve initialization adjustment sequence diagram of the initialize trip curve settings activity 702 shown in FIG. 7. A TCInit function is called from the main module 802. The TC (trip curve) module 804 reads the switch positions 114, 116 from the switch module 808 and fetches the thresholds from the EEPROM 270 (810). The BRGet function is called and the TCUpdate function is iterated 27 times to determine the actual % BR.

Figure 8B:
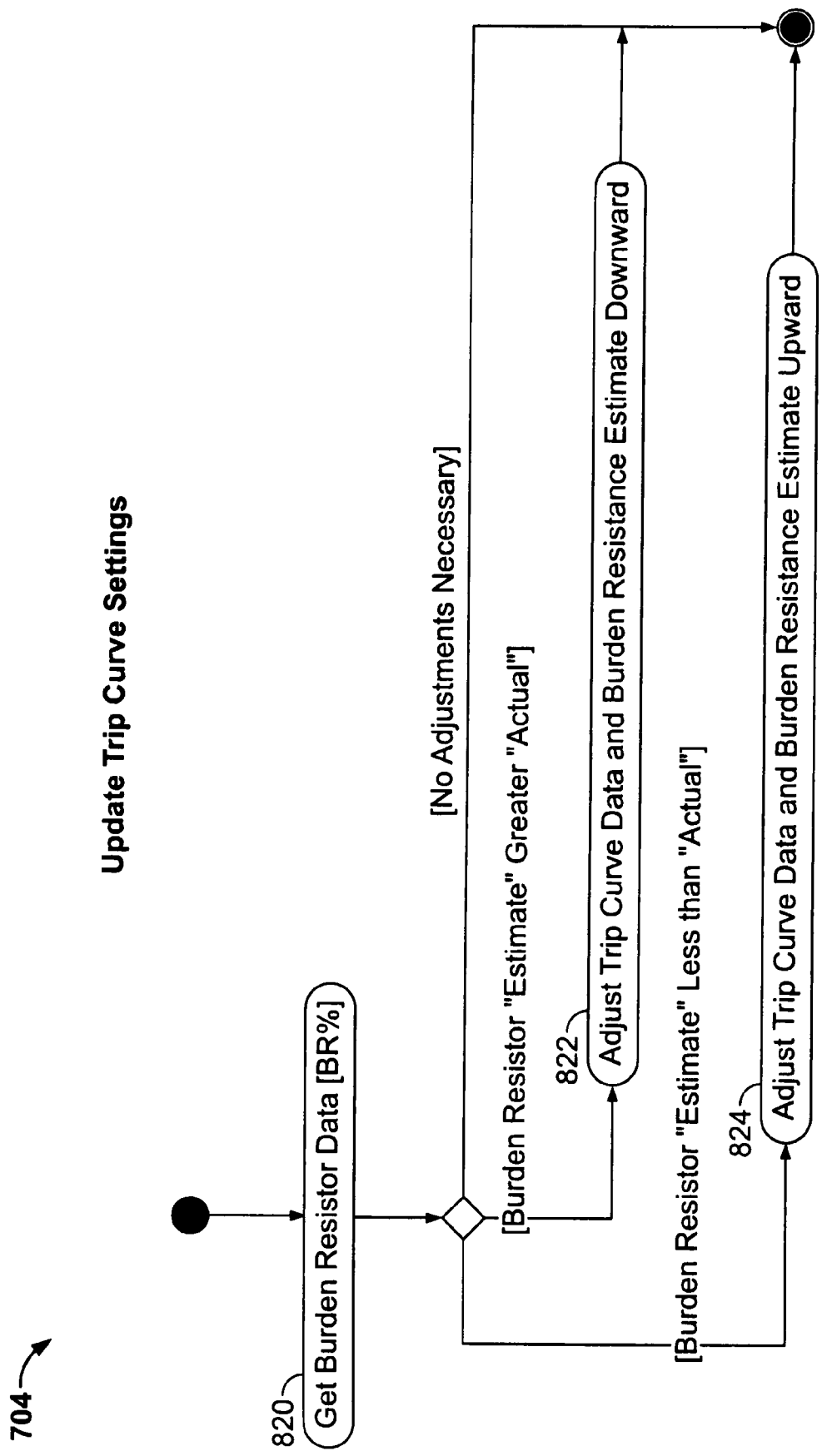
FIG. 8B is a UML diagram of an update trip curve settings sequence shown in FIG. 7.

FIG. 8B expands upon the update trip curve settings activity 704 shown in FIG. 7. The Get Burden Resistor Data (% BR) activity 820 is carried out, which is detailed in FIG. 9A. If the estimated BR is greater than the actual BR, the trip curve data is adjusted downward (822). If the estimated BR is less than the actual BR, the trip curve data is adjusted upward (824).

FIG. 9A illustrates the Get Burden Data (% BR) activity 820 in more detail. The scaled temperature sensor data is obtained (902) (shown in FIG. 9B), and the scaled temperature sensor readings are ranged if necessary (904) (shown in FIG. 9C). The following guards and actions are applicable to the UML diagram shown in FIG. 9A:

| Guard/Action | Description |
|---|---|
| G1 | (Tsv_reading > TS_INFLECTION_POINT) |
| F1 | (BR % = BR_Curve_A (Tsv_reading)) |
| F2 | (BR % = BR_Curve_B (Tsv_reading)) |

If the Tsv_reading is greater than the TS_INFLECTION_POINT, the actual burden resistance is computed from Curve A (906); otherwise it is computed from Curve B (908).

In FIG. 9B, the stored sensor data, which may be scaled and calibrated for an internal offset of the temperature sensor is read (910), and the temperature sensor readings are ranged within upper and lower limits (912) as shown in FIG. 9C. Tsv is ranged to HIGH_TEMP if it is less than the HIGH_TEMP. If Tsv is greater than the LOW_TEMP, it is ranged to LOW_TEMP. Otherwise, if Tsv is within the range limits, it is not adjusted.

FIG. 9D illustrates an activity diagram for reading temperature sensor 222 data (910) shown in FIG. 9B. The calibrated offset magnitude is read from the EEPROM 270 (920). This offset is a decimal value corresponding to the variance of the temperature sensor 222 readings compared to nominal. The calibrated polarity is read from the EEPROM 270 (922) to determine whether adjustments to the temperature sensor 222 readings need to be made upwards or downwards. If the polarity of the offset is negative, the offset stored in the EEPROM 270 is added to the scaled raw output of the temperature sensor 222 (924), effectively calibrating it to a nominal output. Otherwise, the offset is subtracted from the scaled raw output of the temperature sensor 222 (926) to calibrate its readings to nominal. The microcontroller 226 checks for over-temperature events (928) and stores the scaled temperature sensor data (930).

The following exemplary source code exemplifies a TCUpdate routine for updating trip curve thresholds, which can vary as a function of the switch positions and the burden resistance (BR), which varies as a function of temperature.

```
// TCUpdate( )
// The purpose of this routine is to update Trip Curve Thresholds
// Threshold = f(FLA,Im,BR), BR = f(temperature)
// This routine adjusts trip curve thresholds over time.
// This routine is called ~0.5 seconds and multiple times at startup.
void TCUpdate(void)
{
unsigned int BR;
BR = (BrGet( )<<SF);
if ( BR_estimate > BR )
{
BR_estimate = BR_estimate - BR_STEP;
TC.A.word = TC.A.word - TC.A_STEP;
TC.B.word = TC.B.word - TC.B_STEP;
}
else
{
if ( BR_estimate != BR )
{
BR_estimate = BR_estimate + BR_STEP;
TC.A.word = TC.A.word + TC.A_STEP;
TC.B.word = TC.B.word + TC.B_STEP;
}
}
}
```

The following exemplary source code exemplifies a TCInit routine for initializing the TC object.

```
// TCInit( )
// The purpose of this routine is to initialize the Trip Curve Object.
void TCInit(void)
{
unsigned char i;
LookupThresholds( ); // Get Trip curve information from EEPROM 270
// Range Check the Thresholds
if ( (TC.A.word > MAX_A_THRESHOLD) || (TC.A.word <
MIN_A_THRESHOLD) || \ (TC.B.word >
MAX_B_THRESHOLD) || (TC.B.word <
MIN_B_THRESHOLD) || \ (TC.C > MAX_C_THRESHOLD) )
DiagSetFault(THRESHOLD_FAULT);
BR_estimate = BR_INIT_ESTIMATE;
for( i=0; i<27; i++) TCUpdate( );
}
```

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of automatically adjusting a trip current threshold of a circuit breaker, comprising:
receiving a temperature signal from a temperature sensor circuit, the temperature signal being indicative of a temperature sensed by the temperature sensor circuit;
determining, as a function of the temperature signal, a burden resistance value indicative of a resistance of a burden resistor circuit disposed proximate the temperature sensor circuit;
determining a temperature inflection point corresponding to a temperature value where a temperature sensor curve intersects a burden resistance curve, the temperature sensor curve plotting a voltage output of the temperature sensor circuit against temperature and the burden resistance curve plotting resistance across the burden resistor circuit against temperature;
responsive to determining the burden resistance value, adjusting at least one trip current threshold of the circuit breaker as a function of the burden resistance value to produce an adjusted trip current threshold; and
storing the adjusted trip current threshold in memory.

2. The method of claim 1, further comprising scaling the temperature signal to produce a scaled temperature voltage and determining whether the scaled temperature voltage exceeds the temperature inflection point.

3. The method of claim 2, wherein the determining the burden resistance value includes determining a first burden resistance percentage when the scaled temperature voltage exceeds the temperature inflection point and determining a second burden resistance percentage when the scaled temperature voltage does not exceed the temperature inflection point.

4. The method of claim 1, wherein the burden resistance value corresponds to a percentage of burden resistance relative to a nominal burden resistance, and wherein the adjusting the at least one trip current threshold includes decreasing the at least one trip current threshold until the burden resistance value matches an estimated burden resistance value that is initialized to a high temperature burden resistance value at a maximum temperature.

5. The method of claim 4, wherein the decreasing includes decrementing the at least one trip current threshold by an incremental step, the adjusting further including logically shifting the estimated burden resistance value by the incremental step until the burden resistance value matches the estimated burden resistance value.

6. The method of claim 1, wherein the at least one trip current threshold corresponds to a current threshold at a maximum temperature, the maximum temperature corresponding to an upper temperature in a temperature range corresponding to the temperature sensor circuit, the temperature sensor circuit also having a minimum temperature corresponding to a lower temperature in the temperature range.

7. A computer readable medium encoded with instructions for performing the method of claim 1, the instructions being executed by an 8-bit microcontroller.

8. The method of claim 1, wherein the temperature sensor circuit produces a voltage output that is scaled by an analog-to-digital converter to produce a scaled voltage output, the method further comprising:
calibrating the temperature sensor circuit by adding or subtracting an offset to the scaled voltage output of the temperature sensor circuit, the offset being calculated by determining how much the voltage output of the temperature sensor circuit across temperature varies from a voltage output of a nominal temperature sensor across temperature; and
storing the offset in the memory.

9. The method of claim 1, further comprising tripping the circuit breaker when a current sensed by the circuit breaker exceeds the adjusted trip threshold.

10. The method of claim 1, wherein the temperature sensor circuit includes a transistor having at least three terminals, the voltage across two of the at least three terminals varying inversely with changes in temperature, the temperature sensor circuit being disposed proximate the burden resistor circuit such that heat generated by the burden resistor circuit causes the voltage to decrease.

11. The method of claim 1, wherein the burden resistor circuit includes a copper burden resistor having a serpentine shape.

12. The method of claim 1, wherein the circuit breaker is a motor circuit protector.

13. An automatic temperature compensation method for automatically adjusting a trip threshold of a circuit breaker, comprising:
storing in a memory a trip threshold representing a current level that, if exceeded when a maximum temperature is present, causes the circuit breaker to trip;
reading a temperature from a temperature sensor circuit to produce a temperature sensor reading indicative of at least the temperature of a circuit board on which the temperature sensor circuit is disposed, the circuit board including a burden resistor circuit disposed proximate the temperature sensor circuit such that there is temperature coupling between a burden resistor of the burden resistor circuit and a temperature sensor of the temperature sensor circuit;
converting, as a function of the temperature sensor reading and a determined relationship between resistance of the burden resistor circuit and temperature, the temperature sensor reading into a corresponding burden resistor value indicative of a resistance of the burden resistor circuit disposed on the circuit board and electrically coupled to a secondary output of a current transformer of the circuit breaker;
adjusting the trip threshold as a function of the burden resistor value to produce a temperature-compensated trip threshold;
storing the temperature-compensated trip threshold in the memory;
causing the circuit breaker to trip when a primary current sensed by the current transformer exceeds the temperature-compensated trip threshold; and
determining a temperature inflection point representing an intersection between a temperature sensor curve and a burden resistance curve, the temperature sensor curve plotting a voltage output of the temperature sensor circuit against temperature and the burden resistance curve plotting resistance across the burden resistor circuit against temperature; and
matching the temperature sensor reading to the burden resistor value about the temperature inflection point.

14. The method of claim 13, wherein the burden resistor value is a percentage burden resistance representing a percentage offset from a burden resistance at an ambient temperature.

15. The method of claim 13, wherein the burden resistor circuit includes a field-effect transistor having a resistance across its source and drain terminals when the field-effect transistor is turned on.

16. The method of claim 13, wherein the circuit breaker is a motor circuit protector having an operating range that includes a temperature operating range, the maximum temperature representing the upper limit of the temperature operating range.

17. A method of automatically adjusting a trip current threshold of a circuit breaker, comprising:
receiving, in a microcontroller, a temperature signal from a temperature sensor circuit, the temperature signal being indicative of a temperature sensed by the temperature sensor circuit, a temperature sensor of the temperature sensor circuit being disposed proximate a burden resistor circuit such that there is temperature coupling between a burden resistor of the burden resistor circuit and the temperature sensor;
calculating, by the microcontroller, as a function of the temperature signal and a determined relationship between resistance of the burden resistor circuit and temperature, a burden resistance value indicative of a resistance of the burden resistor circuit;
responsive to the determining, adjusting at least one trip current threshold of the circuit breaker as a function of the burden resistance value to produce an adjusted trip current threshold;
storing the adjusted trip current threshold in memory; and
wherein the burden resistance value corresponds to a percentage of burden resistance relative to a nominal burden resistance, and wherein the adjusting the at least one trip current threshold includes decreasing the at least one trip current threshold until the burden resistance value matches an estimated burden resistance value that is initialized to a high temperature burden resistance value at a maximum temperature.

18. An automatic temperature compensation method for automatically adjusting a trip threshold of a circuit breaker, comprising:
storing in a memory a trip threshold representing a current level that, if exceeded when a maximum temperature is present, causes the circuit breaker to trip;
reading a temperature from a temperature sensor circuit to produce a temperature sensor reading indicative of at least the temperature of a circuit board on which the temperature sensor circuit is disposed, the circuit board including a burden resistor circuit disposed proximate the temperature sensor circuit such that there is temperature coupling between a burden resistor of the burden resistor circuit and a temperature sensor of the temperature sensor circuit;
converting, as a function of the temperature sensor reading and a determined relationship between resistance of the burden resistor circuit and temperature, the temperature sensor reading into a corresponding burden resistor value indicative of a resistance of the burden resistor circuit disposed on the circuit board and electrically coupled to a secondary output of a current transformer of the circuit breaker;

adjusting the trip threshold as a function of the burden resistor value to produce a temperature-compensated trip threshold;

storing the temperature-compensated trip threshold in the memory;

causing the circuit breaker to trip when a primary current sensed by the current transformer exceeds the temperature-compensated trip threshold; and wherein the burden resistor value is a percentage burden resistance representing a percentage off set from a burden resistance at an ambient temperature.

19. An automatic temperature compensation method for automatically adjusting a trip threshold of a circuit breaker, comprising:

storing in a memory a trip threshold representing a current level that, if exceeded when a maximum temperature is present, causes the circuit breaker to trip;

reading a temperature from a temperature sensor circuit to produce a temperature sensor reading indicative of at least the temperature of a circuit board on which the temperature sensor circuit is disposed, the circuit board including a burden resistor circuit disposed proximate the temperature sensor circuit such that there is temperature coupling between a burden resistor of the burden resistor circuit and a temperature sensor of the temperature sensor circuit;

converting, as a function of the temperature sensor reading and a determined relationship between resistance of the burden resistor circuit and temperature, the temperature sensor reading into a corresponding burden resistor value indicative of a resistance of the burden resistor circuit disposed on the circuit board and electrically coupled to a secondary output of a current transformer of the circuit breaker;

adjusting the trip threshold as a function of the burden resistor value to produce a temperature-compensated trip threshold;

storing the temperature-compensated trip threshold in the memory;

causing the circuit breaker to trip when a primary current sensed by the current transformer exceeds the temperature-compensated trip threshold; and wherein the burden resistor circuit includes a field-effect transistor having a resistance across its source and drain terminals when the field-effect transistor is turned on.

* * * * *